United States Patent
An et al.

(10) Patent No.: US 8,489,781 B1
(45) Date of Patent: Jul. 16, 2013

(54) DETECTION SYSTEM AND METHODS

(75) Inventors: Hongming An, San Diego, CA (US);
CongQing Xiong, Shenzhen (CN);
Heng Wang, Shenzhen (CN)

(73) Assignee: SMSC Holdings S.A.R.L., Luxembourg (LU)

( * ) Notice: Subject to any disclaimer, the term of this patent is extended or adjusted under 35 U.S.C. 154(b) by 689 days.

(21) Appl. No.: 12/721,268

(22) Filed: Mar. 10, 2010

(51) Int. Cl.
*G06F 3/00* (2006.01)
*H02J 7/00* (2006.01)

(52) U.S. Cl.
USPC ............................................ 710/15; 320/137

(58) Field of Classification Search
None
See application file for complete search history.

(56) References Cited

U.S. PATENT DOCUMENTS

| | | | | |
|---|---|---|---|---|
| 2004/0104757 A1* | 6/2004 | Vargas | | 327/334 |
| 2006/0000917 A1* | 1/2006 | Kim et al. | | 235/492 |
| 2008/0185444 A1* | 8/2008 | Kim et al. | | 235/492 |
| 2010/0052620 A1* | 3/2010 | Wong | | 320/137 |

* cited by examiner

*Primary Examiner* — Hyun Nam
(74) *Attorney, Agent, or Firm* — King & Spalding L.L.P.

(57) ABSTRACT

Various techniques are provided to facilitate a detection system to detect a presence of an externally coupled receiver device, such as a universal serial bus (USB) device. In one example, the system generates a reference current and passes the reference current via a conductor to a shared buffer circuit. The shared buffer circuit is adapted to selectively pass the reference current or a communication signal to the externally coupled receiver device. The system switches between a detect mode where the reference current is provided to the externally coupled receiver device and between a communicate mode where the reference current is blocked and the communication signal is provided to the externally coupled receiver device. The system monitors a voltage value of the conductor and the system monitors a time for the voltage value to reach a pre-determined threshold value in response to the reference current. The system detects a presence of the externally coupled receiver device based on the monitored time.

23 Claims, 11 Drawing Sheets

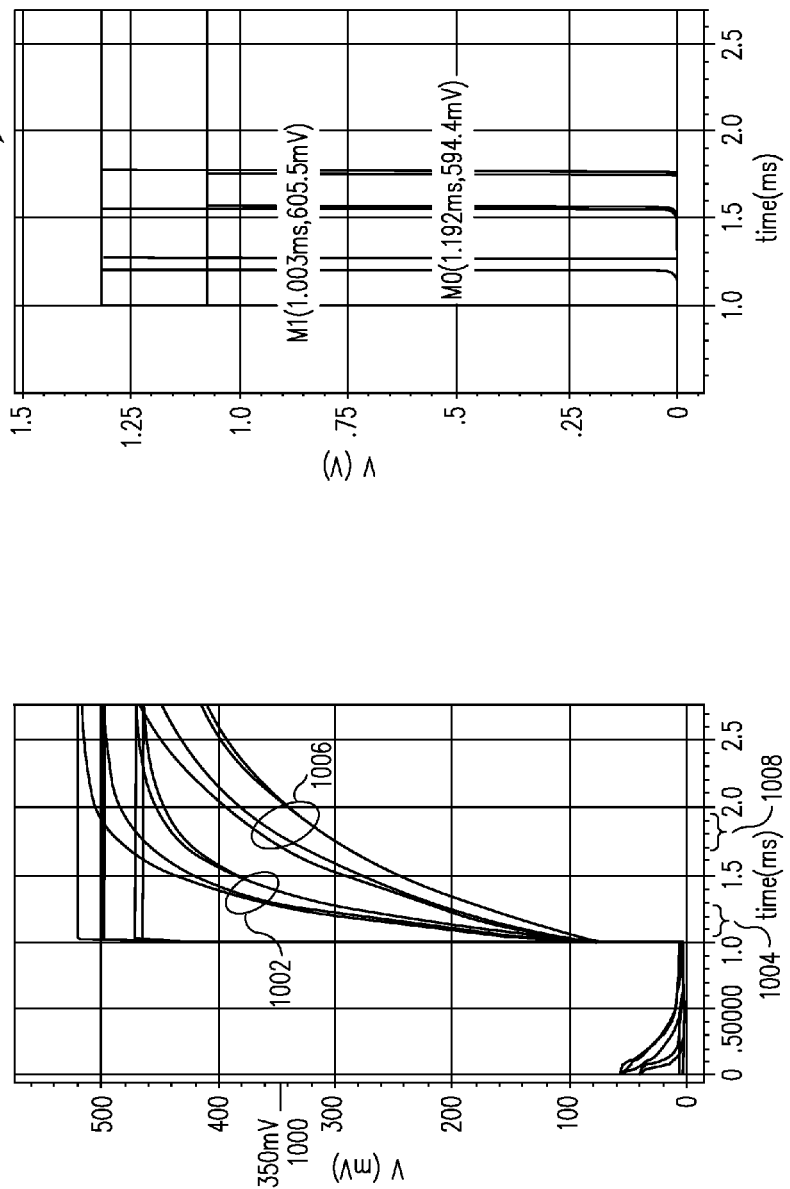

DETECTION SYSTEM AND METHODS

BACKGROUND

1. Field of the Invention

The present invention generally relates to a detection system and more particularly to a detection system to detect connection of an externally coupled device.

2. Related Art

Universal serial bus (USB) devices, such as USB 2.0 devices, are commonly used in the computer industry for tasks such as data storage, communications, printer/scanner connections, and other tasks. Generally, when a USB device is first connected to a USB host computer, a process is started to detect the new USB device.

In various conventional implementations, separate systems may be needed to perform detecting and communicating tasks. Accordingly, there is a need for an improved approach to the detection of externally coupled devices.

SUMMARY

Various techniques are provided for detecting a presence of a receiver device coupled to a detection circuit. For example, in one embodiment, a method of detecting a presence of an externally coupled receiver device is provided. The method includes generating a reference current. The method includes passing the reference current via a conductor to a shared buffer circuit, wherein the shared buffer circuit is adapted to selectively pass the reference current or a communication signal to the externally coupled receiver device. The method also includes switching between a detect mode where the reference current is provided to the externally coupled receiver device and between a communicate mode where the reference current is blocked and the communication signal is provided to the externally coupled receiver device. The method further includes monitoring a voltage value of the conductor and a time for the voltage value to reach a pre-determined threshold value in response to the reference current. Thereby, the method provides detecting a presence of the externally coupled receiver device based on the monitored time.

In another embodiment, a detection circuit device is provided. The detection circuit device is adapted to detect a presence of an externally coupled receiver device. The detection circuit device includes a transmitter circuit adapted to generate a reference current. The detection circuit device also includes a shared buffer circuit. The shared buffer circuit is adapted to receive the reference current via a conductor. The shared buffer circuit is also adapted to selectively pass the reference current or a communication signal to the externally coupled receiver device. The shared buffer circuit is further adapted to switch between a detect mode where the reference current is provided to the externally coupled receiver device and between a communicate mode where the reference current is blocked and the communication signal is provided to the externally coupled receiver device. The detection circuit device further includes a detection circuit adapted to monitor a voltage value of the conductor and a time for the voltage value to reach a pre-determined threshold value in response to the reference current and detect a presence of the externally coupled receiver device based on the monitored time.

In another embodiment, a USB hub device is provided. The USB hub device includes a USB communication signal input. The USB hub device also includes a detection circuit device. The detection circuit device is adapted to detect a presence of an externally coupled receiver device. The detection circuit device includes a transmitter circuit adapted to generate a reference current. The detection circuit device also includes a shared buffer circuit. The shared buffer circuit is adapted to receive the reference current via a conductor. The shared buffer circuit is also adapted to selectively pass the reference current or a communication signal to the externally coupled receiver device. The shared buffer circuit is further adapted to switch between a detect mode where the reference current is provided to the externally coupled receiver device and between a communicate mode where the reference current is blocked and the communication signal is provided to the externally coupled receiver device. The detection circuit device further includes a detection circuit adapted to monitor a voltage value of the conductor and a time for the voltage value to reach a pre-determined threshold value in response to the reference current and detect a presence of the externally coupled receiver device based on the monitored time.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

FIG. 10 illustrates a chart of charging ramps (time vs. voltage) for a detection system in accordance with an embodiment of the present invention.

FIG. 11 illustrates a chart of a comparator output signal (time vs. voltage) for a detection system in accordance with an embodiment of the present invention.

Embodiments of the present invention and their advantages are best understood by referring to the detailed description

DETAILED DESCRIPTION

In accordance with embodiments further described herein, various techniques are provided to permit detection of an externally coupled receiver device (also referred to as a receiver device), such as a USB device. Although such techniques are primarily described herein with regard to USB 3.0 devices, other devices may also be used in various embodiments.

Figure 1:
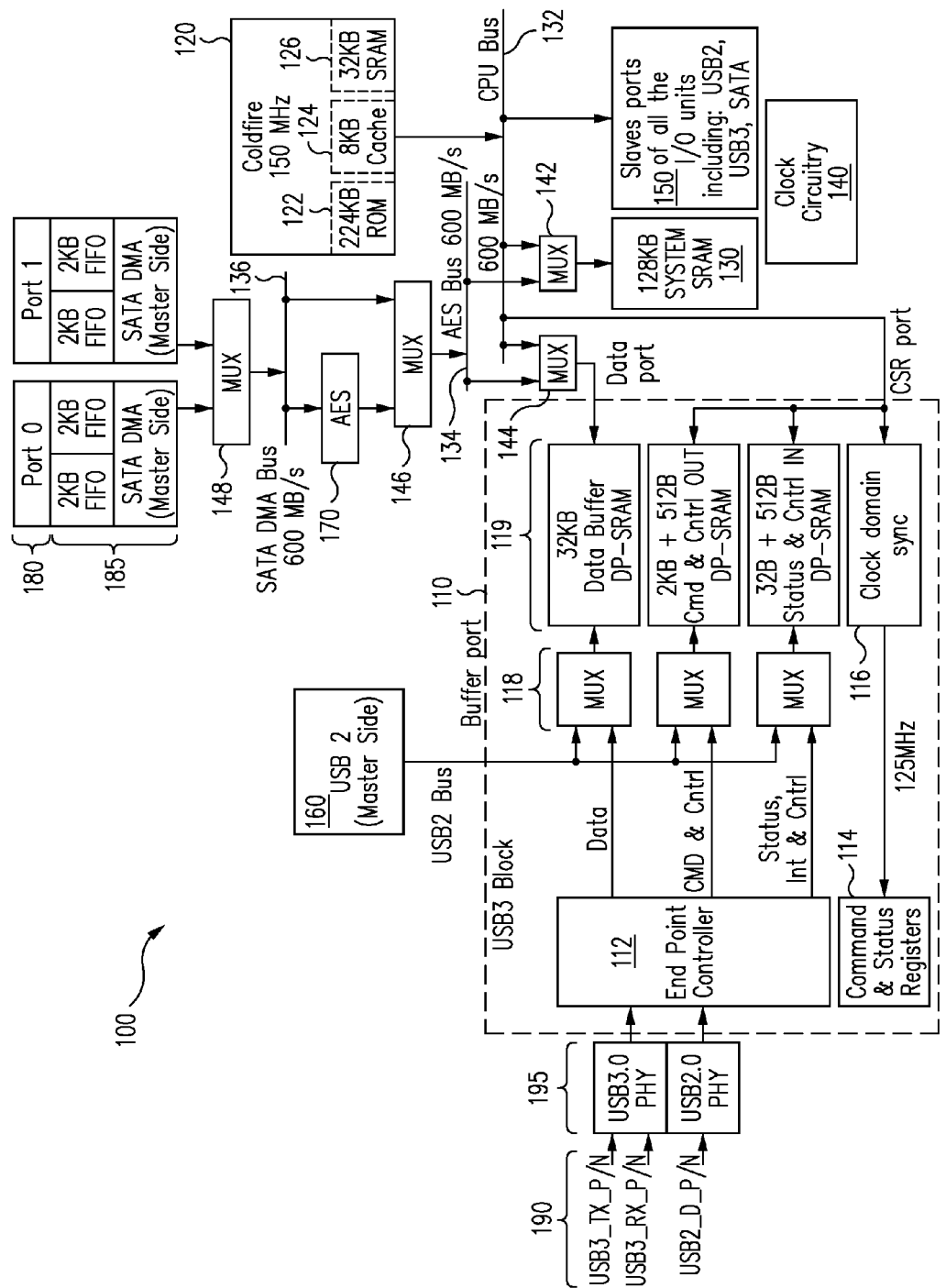
FIG. 1 illustrates a block diagram of a system which may be used to interface with a variety of different devices over various ports in accordance with an embodiment of the present invention.

FIG. 1 illustrates a block diagram of a system 100 which may be used to interface with a variety of different devices over various ports. In one embodiment, system 100 may be implemented as a system on a chip that manages communications between a host device and one or more other devices. For example, system 100 may be used to provide bridging, hosting, and/or hub operations in accordance with various communication protocols.

System 100 includes a device controller 110, a processor 120, system memory 130, clock circuitry 140, slave ports 150, a configuration port 160, an encryption block 170, communication ports 180, physical layer components 185, communication ports 190, and physical layer components 195.

As shown in FIG. 1, system 100 includes various busses 132, 134, and 136, and multiplexers 142, 144, 146, and 148 to facilitate communications between device controller 110, processor 120, system memory 130, slave ports 150, encryption block 170, physical layer components 185, and physical layer components 195.

Device controller 110 may be configured to manage communications to and from physical layer components 195 associated with communication ports 190. For example, device controller 110 may be used to host one or more devices connected to communication ports 190. In one embodiment, device controller 110 may be implemented as a USB controller configured to permit system 100 to operate as a USB host to one or more USB slave devices connected to communication ports 190. As shown in FIG. 1, device controller 110 includes an end point controller 112, command and status registers 114, a clock domain synchronization block 116, multiplexers 118, and various memory blocks and buffers 119.

Processor 120 may be implemented, for example, as a Coldfire processor operating at 150 MHz with various associated memories and caches 122, 124, and 126. Processor 120 may be used, for example, to perform various bridging, hosting, and/or hub operations for communications exchanged between communication ports 180 and 190 as well as slave ports 150.

System memory 130 may be used by processor 120 and/or other components of system 100 to support the various operations of system 100. Clock circuitry 140 may be used to provide one or more clock signals to system 100. Slave ports 150 may be used to interface system 100 with various types of slave devices as may be desired in various implementations. Configuration port 160 may be implemented, for example, as a USB 2.0 port used to configure system 100 for desired operations. Encryption block 170 may be implemented, for example, to perform Advanced Encryption Standard (AES) encryption on data passed between communication ports 180 and the rest of system 100.

Communication ports 180 may be implemented, for example, as storage media device ports configured to support communications with storage media devices such as hard drives, flash drives (e.g., thumb drives, solid state drives, or others), optical storage media (e.g., CD-ROM, DVD, HD-DVD, Blu-Ray, or others), or other appropriate storage media devices. Such storage media device ports may be implemented in accordance with Serial Advanced Technology Attachment (SATA) interfaces, external SATA (eSATA) interfaces, Parallel Advanced Technology Attachment (PATA) interfaces, flash memory interfaces, or others. In the embodiment shown in FIG. 1, communication ports 180 are implemented as SATA interfaces. Physical layer components 185 may be used to facilitate communications between communication ports 180 and the rest of system 100.

Communication ports 190 may be implemented, for example, in accordance with various communication standards such as, for example, USB 3.0, USB 2.0, Firewire (e.g., IEEE 1394), or others. In the embodiment shown in FIG. 1, communication ports 190 are implemented as USB 2.0 and USB 3.0 ports. Physical layer components 195 may be used to facilitate communications between communication ports 190 and the rest of system 100.

In one embodiment, an external host device may be connected to one of communication ports 190. In this embodiment, system 100 may be configured to host one or more devices connected to communication ports 180 and/or 190 on behalf of the host device.

In this regard, system 100 may facilitate communications between the host device and/or the various hosted devices.

In one embodiment, physical layer components 195 may include appropriate components and related circuitry (e.g., a detection system and/or a detection circuit) to support the detection of an external device coupled to communication ports 190 in the manner further described herein.

Figure 2:
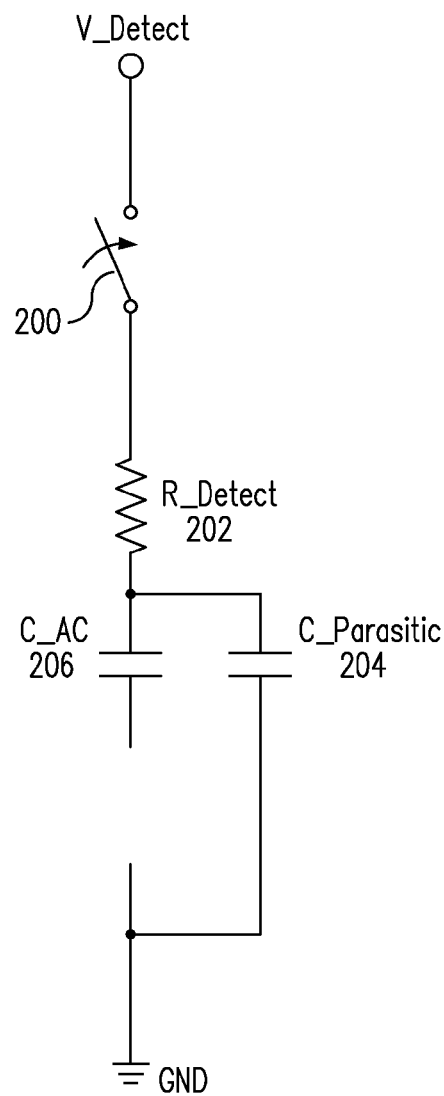
FIG. 2 illustrates a schematic diagram for a detection circuit with no termination present in accordance with an embodiment of the present invention.
Figure 3:
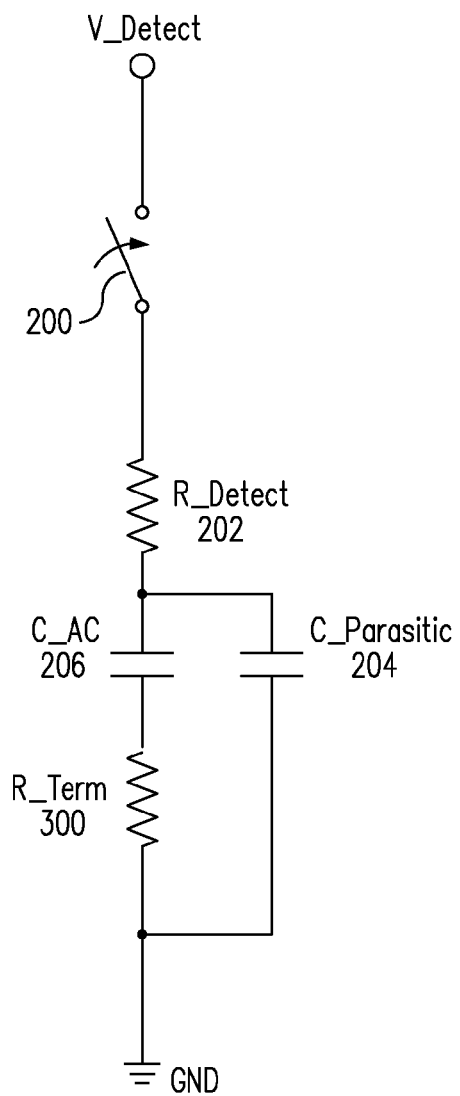
FIG. 3 illustrates a schematic diagram for a detection circuit shown in FIG. 2 with a termination present in accordance with an embodiment of the present invention.

FIG. 2 illustrates a schematic diagram for a detection circuit with no termination present, thereby indicating that no receiver device is connected to the transmitter, in accordance with an embodiment of the present invention. FIG. 3 illustrates the schematic diagram as shown in FIG. 2 but now with a termination present, thereby indicating that a receiver device, represented by the terminal load, is connected to the transmitter, in accordance with an embodiment of the present invention. The detection circuit is implemented as part of a transmitter system to detect whether a load impedance equivalent to a direct current (DC) impedance is present at the receiver device. The detection circuit is included between a voltage detection terminal V_Detect and an electrical ground. The detection circuit includes a switch 200, a detection resistor R_Detect 202 (e.g., a specific charging resistor), alternating current (AC) capacitor C_AC 206, parasitic capacitor C_Parasitic 204 and electrical ground GND.

In FIG. 2, there is no direct connection from capacitor 206 to GND, indicating that no receiver device is coupled to the circuit. On the other hand, the circuit of FIG. 3 is an equivalent to the circuit of FIG. 2, except a termination resistor R_Term 300 is coupled between capacitor 206 and GND. Accordingly, the circuit only realizes capacitor C_AC 206 in the circuit if the resistor 300 is present in the circuit.

The circuits shown in FIGS. 2 and 3 operate on the principle of an RC time constant of the circuit. The time constant changes based on the presence of the receiver termination, which is shown as R_Term 300. In an embodiment, a detect voltage transition is in a common mode and the receiver detect sequence is in a positive common mode voltage and negative voltage receiver detection is not allowed.

In operation, a transmitter providing a signal (e.g., a reference current) from V_Detect starts at a stable voltage prior to the detection sequence. The circuit sends the signal from V_Detect through the switch 200 and resistor 202 and then through capacitor 204. The signal will also pass through capacitor 206 and resistor 300 if the receiver device, which is indicated as resistor R_Term 300, is present in the circuit. The time for the voltage at V_Detect is measured when switch 200 is closed. The time value for the voltage at V_Detect to reach a pre-determined value depends on whether the capacitor 206 and resistor 300 are in the circuit (e.g., whether the receiver device is connected in the circuit). In other words, without the receiver attached, the voltage value at V_Detect will rise to the pre-determined value faster with only capacitor 204 in the RC circuit, than with capacitors 204 and 206 and resistor 300 in the circuit. This is seen in FIG. 10.

FIG. 10 illustrates a chart of charging ramps (time vs. voltage) for a detection system in accordance with an embodiment of the present invention. As shown, the threshold voltage 1000 (e.g., 350 mV) is reached by curves 1002 at times 1004 when no terminal load is present in the circuit. On the other hand, the threshold voltage 1000 is reached by curves 1006 at times 1008 when a termination load is present in the circuit. As can be seen, the times at 1004 are shorter than the times at 1008.

In other words, it is to be understood that, the receiver load is detected based on the rate that the voltage at V_Detect changes to voltage level of the transmitter. As such, it is determined that the receiver is not present if the voltage at the transmitter (e.g., V_Detect) charges at a rate dictated by the transmitter impedance and the capacitance of the interconnection between the transmitter and the receiver and the series capacitor (e.g., 204). Conversely, it is determined that the receiver is present if the voltage at the transmitter (e.g., V_Detect) charges at a rate dictated by the transmitter impedance, the capacitance of the interconnect, the series capacitor (e.g., 204), AC capacitance 206 and the receiver termination resistance (e.g., 300).

In an embodiment, during a device connection, the device (e.g., a USB 3.0 device) receiver may guarantee that it is in a high impedance state while its power plane is stabilizing. This avoids the host device falsely detecting the receiver device and starting the training sequence before the device is ready. Similarly, a disabled device is to keep its receiver termination in high impedance until directed to by a higher layer to exit from the disabled state.

Figure 4:
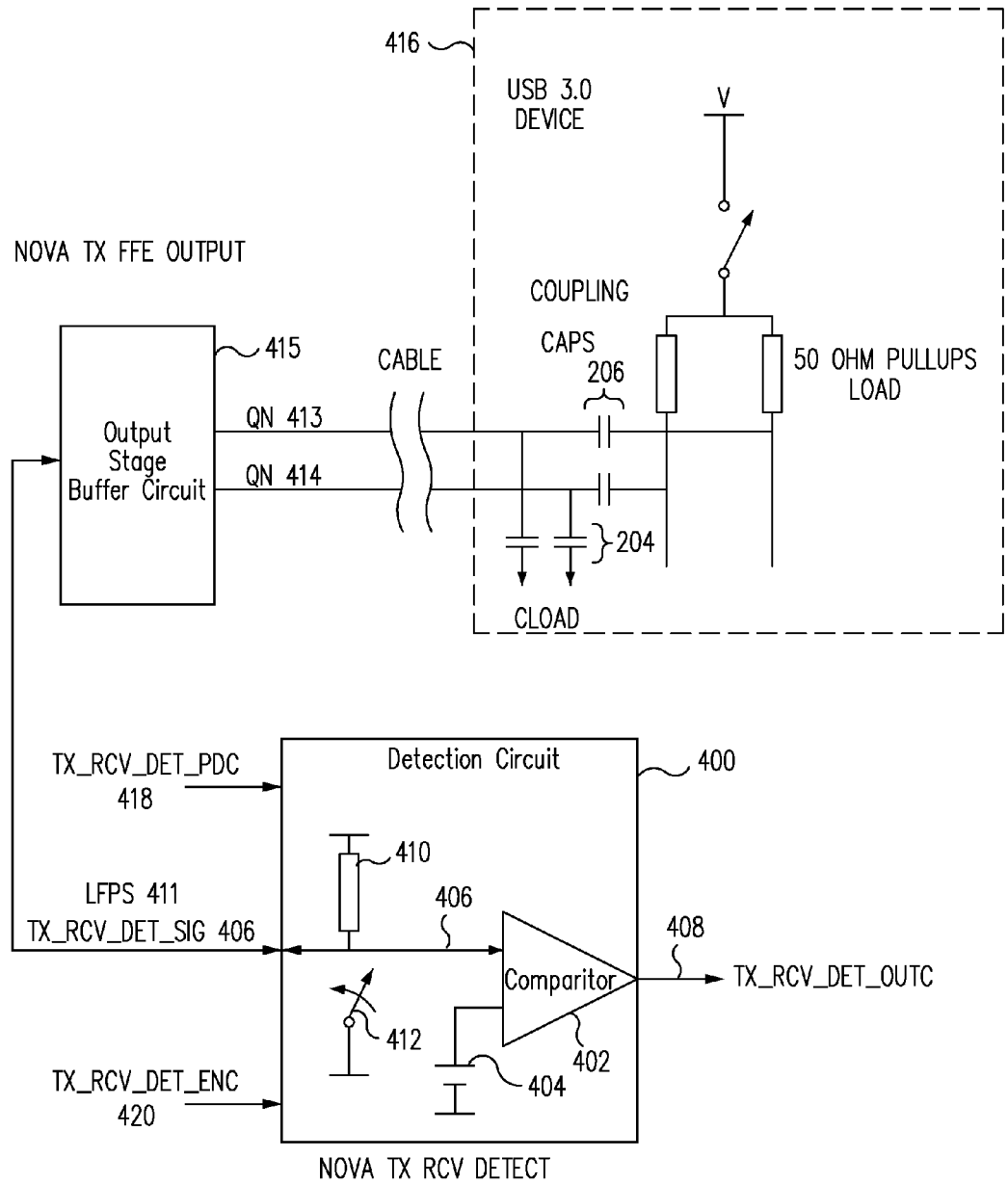
FIG. 4 illustrates a block diagram of a detection system including a detection circuit coupled to a USB 3.0 device via an output buffer circuit in accordance with an embodiment of the present invention.

FIG. 4 illustrates a block diagram of a detection system including a detection circuit 400 coupled to a receiver device 416 (also referred to as a load, load device, and receiver) via an output buffer circuit 415 in accordance with an embodiment of the present invention. In one embodiment, receiver device 416 may be a USB 3.0 device. The detection circuit 400 includes a comparator 402, a detect bias circuit 404, a reference generator 410 and a switch 412. The detection circuit 400 receives inputs at TX_RCV_DET_PDC 418, and TX_RCV_DET_ENC 420. The detection circuit 400 provides an output at the comparator output TX_RCV_DET_OUTC 408. The detection circuit 400 has an input and an output at TX_RCV_DET_SIG 406. When the detection circuit 400 initiates a detect sequence to determine a presence of the receiver device 416, the switch 412 is open so the reference generator 410 provides a current that travels out 406 along the LFPS conductor 411 to the buffer circuit 415. As should be understood, the reference generator 410 is driven by the input at node 418 and the switch 412 is driven by active low input a node 420. The comparator 402 uses the bias circuit 404 to and the input voltage value on 406 to determine when the voltage on 406 exceeds a pre-determined value. At such time, the output 408 of the comparator 402 goes from low to high. A processor receiving a signal from the output 408 of the comparator 402 determines a rate at which the voltage on 406 reaches the pre-determined value to determine detection of the receiver device 416.

In an embodiment, detection circuit 400 sends a 600 mV positive pulse along the conductor 411 to determine if there is an AC grounded load (e.g., receiver device 416) at the output of the buffer circuit 415. The buffer circuit 415 splits the current from detection circuit 400 and passes it to the receiver device 416 via cables QN at node 413 and QP at node 414. It is contemplated that the cables at nodes 413 and 414 are a differential cable used for differential communication signals at other times (e.g., when detection circuit 400 is not operating to detect the presence of receiver device 416). If the delay for the voltage at 406 to reach the pre-determined value (e.g., 350 mV) is under 100 micro seconds, then it is determined that there is either no device (e.g., receiver device 416) plugged into the buffer circuit 415 or the device (e.g., receiver device 416) is in a high impedance mode. Once the device (e.g., receiver device 416) is coupled to the detection circuit 400 and is ready to go active, the system will turn on the AC ground reference inside the receiver device 416 (e.g., the switch inside the receiver device 416 is closed), which will, in turn, cause the delay for the voltage 406 to reach the pre-determined value to extend beyond a certain value (e.g., 200 micro seconds). See FIGS. 10 and 11, where FIG. 11 illustrates a chart of the comparator output 408 signal (time vs. voltage) for the detection system in accordance with an embodiment of the present invention.

Accordingly, it should be understood that, in certain embodiments, the systems provided herein may advantageously include only a few main components, such as, the reference generator 410, the comparator 402, the shared buffer circuit 415, the conductor 411 (e.g., a PCB trace, connectors, cable ensemble) and a receiver load device, such as the USB device 3.0. In an embodiment, the reference circuit 410 generates the required current reference to charge the loading capacitor 206, when the voltage increases to a pre-determined level, the comparator 402 generates a high level output 408 to indicate the charging time needed to reach the pre-determined voltage level. Depending on this time, a digital processing unit or other system (e.g., receiving output 408) may determine if there is a low impedance or high impedance for the receiver device 416. If the impedance is high, there is no receiver device 416 coupled or the receiver device 416 is not ready to communicate. On the other hand, if the impedance is low, there is a receiver device 416 coupled to the buffer circuit 415 and that receiver device 416 is ready to communicate. In an embodiment, the charging path shared with the buffer provide the charging current to the cables at nodes 413 and 414. In this mode the output buffer's 50 Ohm terminator is disconnected from the circuit.

Figure 5:
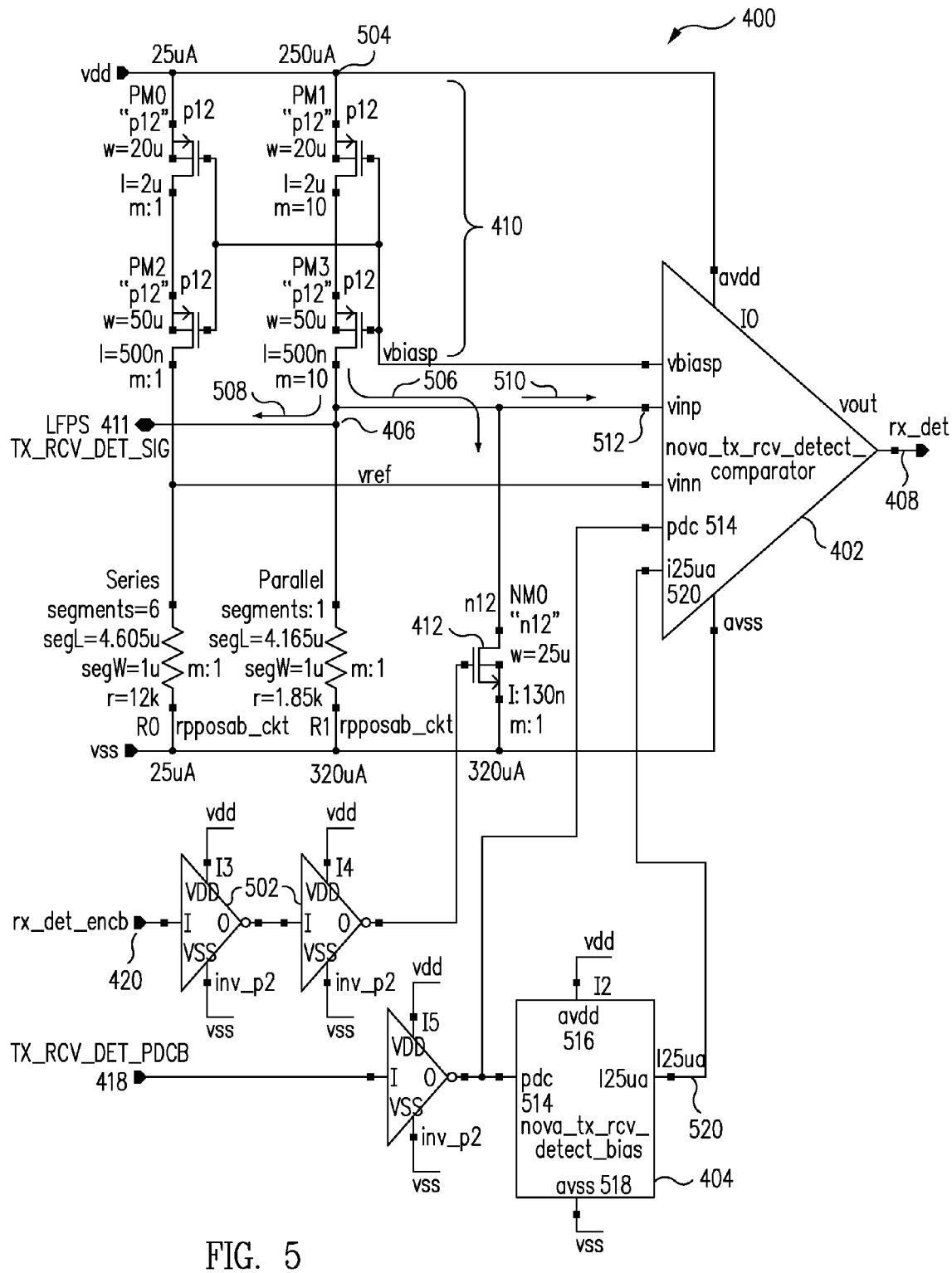
FIG. 5 illustrates a schematic diagram of a detection circuit in accordance with an embodiment of the present invention.

FIG. 5 illustrates a schematic diagram of the detection circuit 400 in accordance with an embodiment of the present invention. This detection circuit 400 receives input 420 at gates 502. The input 420 is an active low logic input that is used to open and close switch 412. Accordingly, when the detection circuit 400 is not in a detection mode, the switch 412 is closed and current from current source 504 travels along path 506. In an embodiment, the current from the current source at 504 is approximately 25 micro Amps. However, it is contemplated that other currents may be used. On the other hand, when the detection circuit 400 is in a detection mode, the switch 412 is open and current from current source at 504 travels along path 508 to the buffer circuit 415 via the conductor 411. As should be understood, the voltage returning along conductor 510 to the vinp comparator input 512 rises as the capacitors of the receiver device 416 charge after receiving the split currents along cables at nodes 413 and 414.

As discussed with reference to an embodiment presented above, when the voltage conductor at 510 and input 512 increases to a pre-determined level (e.g., 350 mV), the comparator 402 generates a logic high output 408 to indicate the charging time needed to reach the pre-determined voltage level. Depending on this time, a digital processing unit or other system (e.g., receiving output 408) may determine whether receiver device 416 exhibits a low impedance or a high impedance. If the impedance is high, receiver device 416 is not coupled or the receiver device 416 is not ready to communicate. On the other hand, if the impedance is low, receiver device 416 is coupled to the buffer circuit 415 and that receiver device 416 is ready to communicate.

Operation of other components shown in the circuit of FIG. 5 should be readily apparent to one having ordinary skill in the art. For example, the detect bias circuit 404 includes input pdc 514, paths avdd 516 and ayss 518. Accordingly, an output current at i25 ua is provided at node 520 to the comparator 402.

Figure 6A:
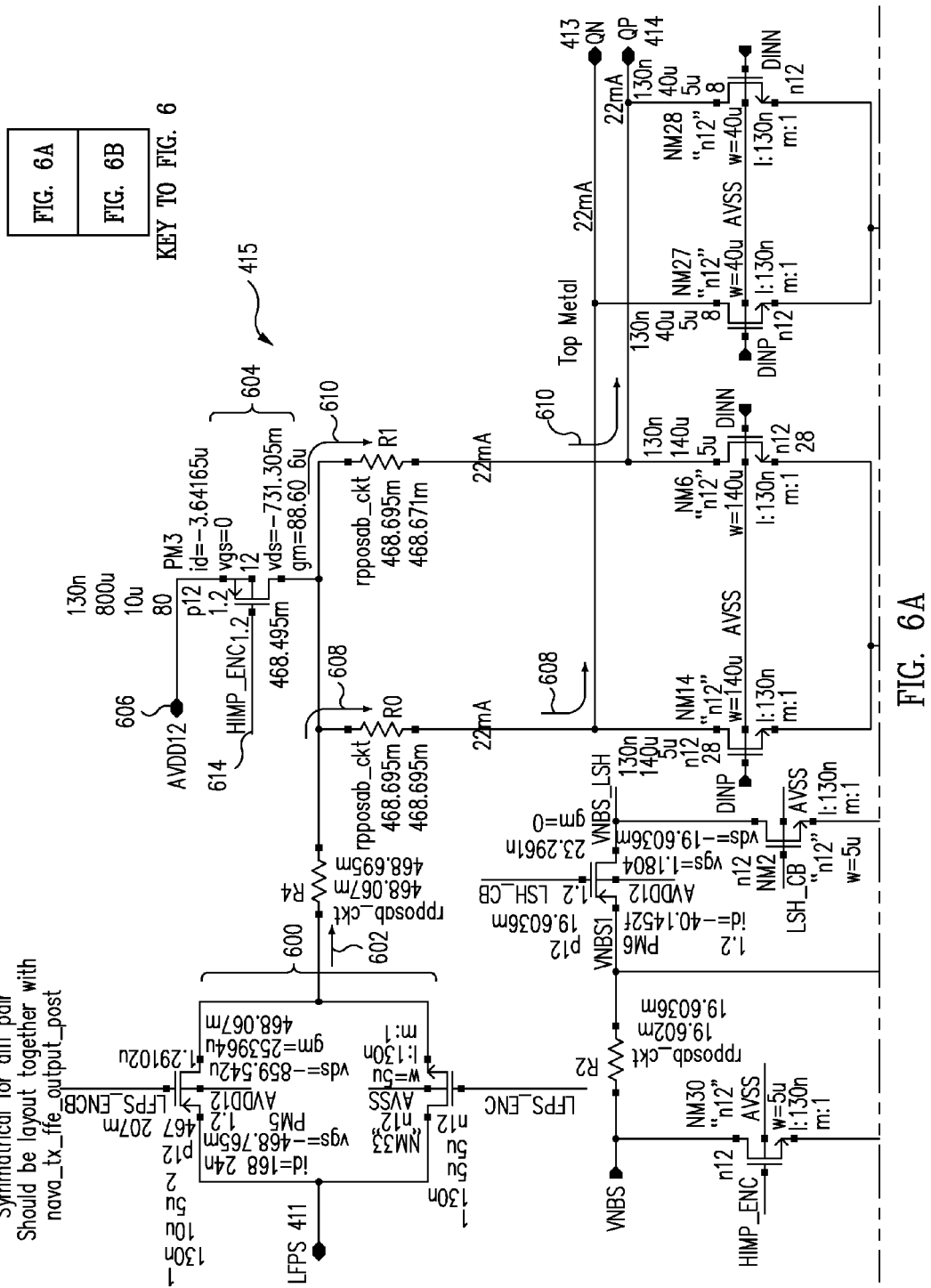
FIG. 6 illustrates a schematic diagram of a shared buffer circuit in accordance with an embodiment of the present invention.
Figure 6B:
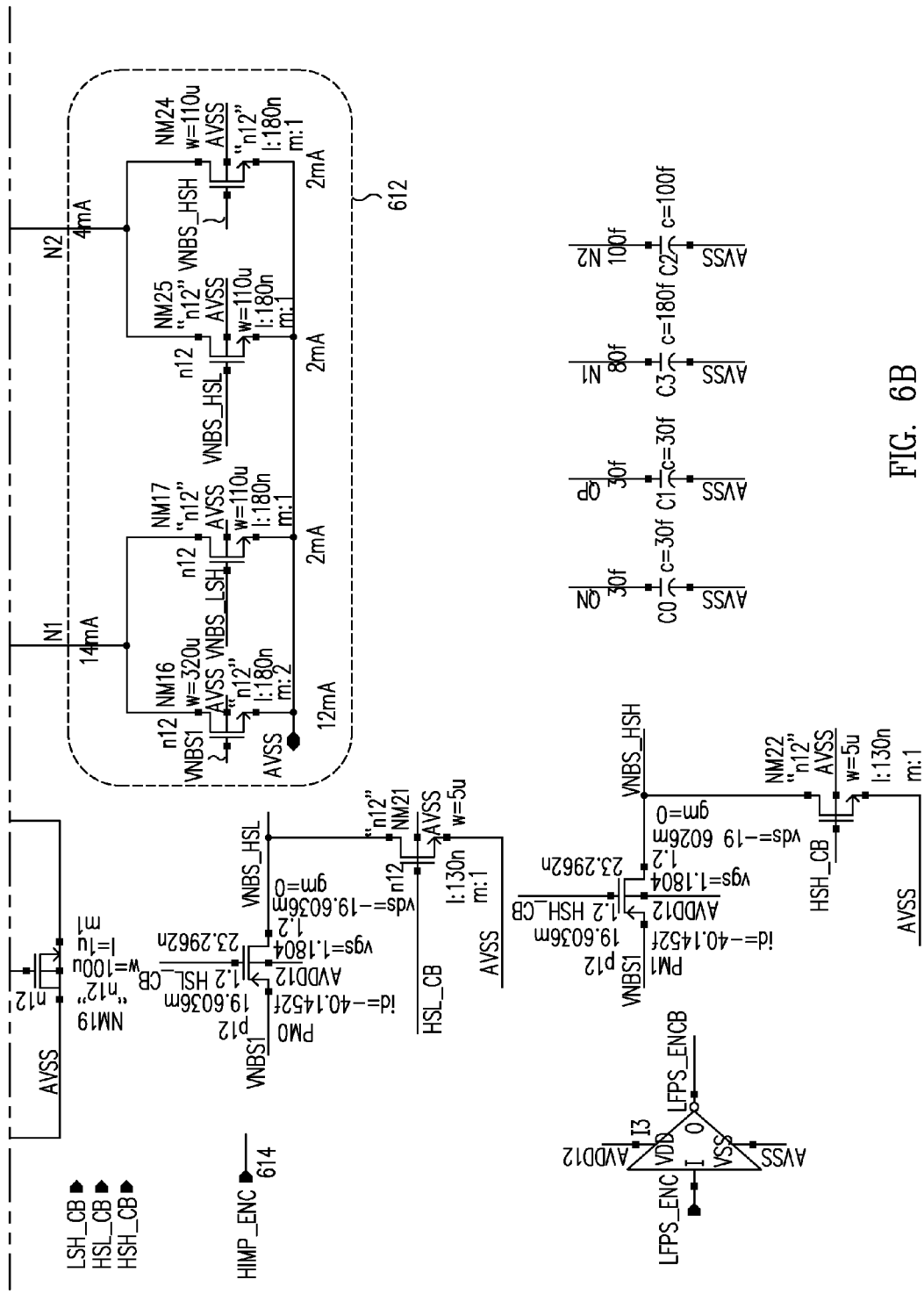

FIG. 6 illustrates a schematic diagram of the shared buffer circuit 415 in accordance with an embodiment of the present invention. As discussed previously, the buffer circuit 415 receives a current from the detection circuit 400 via the conductor 411. The switch circuit 600 either blocks the current provided at 411 in a communication mode or passes the current as a pulse 602 to the receiver device 416 along signal flow paths 608 and 610 and through differential cables at nodes 413 and 414 in a detect mode. The shared buffer circuit 415 toggles between providing the detect signal pulse 602 to the receiver device 416 when in the detect mode and providing a traditional USB communication signal to the receiver device 416 when not in the detect mode (e.g., when in a communication mode).

When in the detect mode, switch 604 is open, thus blocking communication signals provided to the circuit at conventional communication signal input 606. The toggling of the switch 604 is performed by the HIMP_ENC detect/communication switch signal at the gate 614 of the switch 604. In addition, the current source switches shown at 612 are turned off during the detect mode, thus allowing the pulse signal 602 to be the only signal to contribute to charging the load capacitors of the receiver device 416. The communication signal at 606 and the current sources at 612 may then be turned back on and switch 604 may be closed after the detect mode is completed, thereby allowing these to pass to the receiver device 416 at output cables at nodes 413 and 414.

When in the communicate mode, switch 604 is closed, thus allowing communication signals provided to the circuit at conventional communication signal input 606. The toggling of the switch 604 is performed by the HIMP_ENC detect/ communication switch signal at the gate 614 of the switch 604. In addition, the current source switches shown at 612 are turned on during the communicate mode, thus providing current to the receiver device 416. The communication signal at 606 and the current sources at 612 may then be turned off and switch 604 may be opened after the communicate mode is completed, thereby blocking these from passing to the receiver device 416 at output cables at nodes 413 and 414. Operation of other components shown in FIG. 6 and not discussed herein should be readily apparent to those having ordinary skill in the art.

Figure 7A:
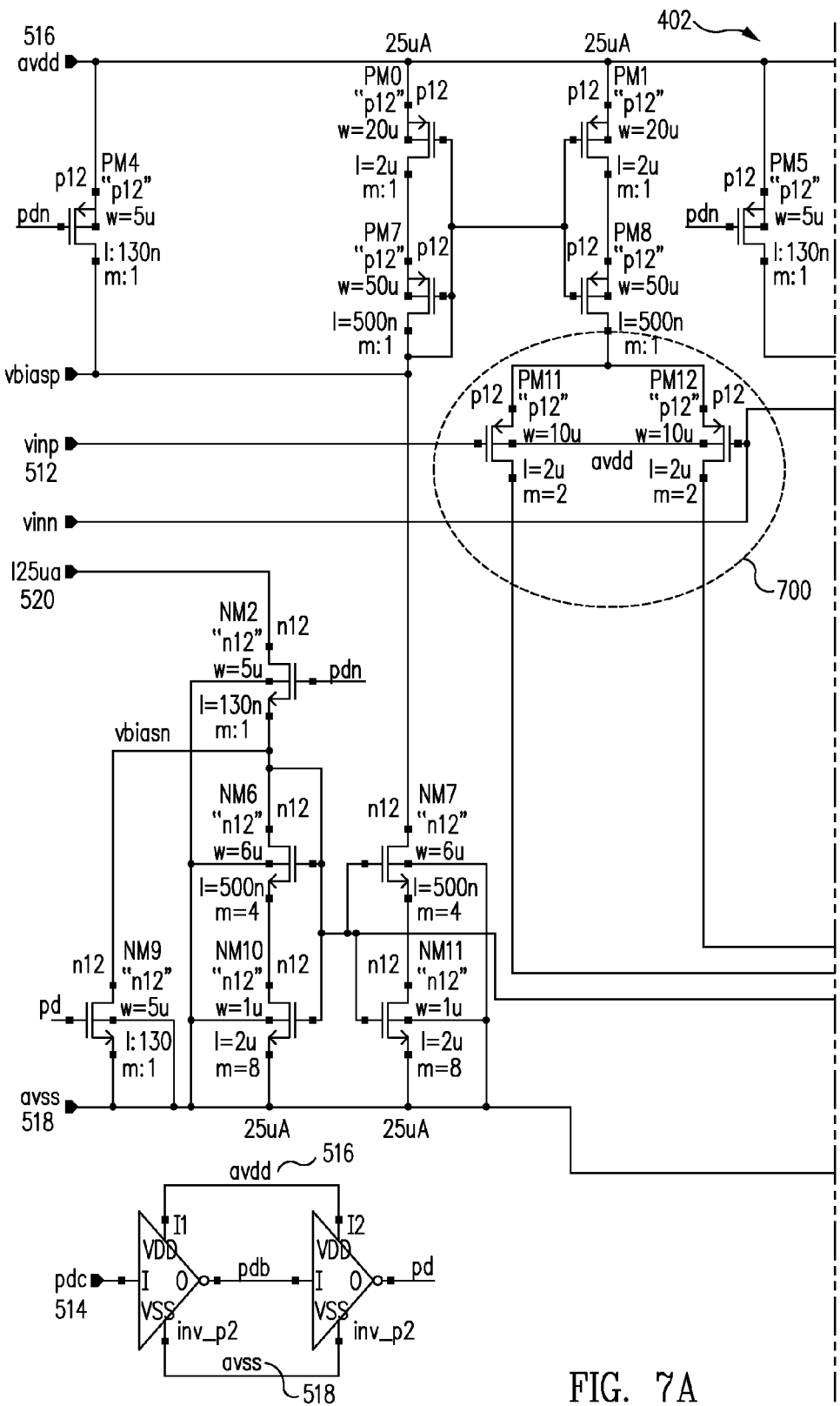
FIG. 7 illustrates a schematic diagram of a comparator circuit in accordance with an embodiment of the present invention.
Figure 7B:
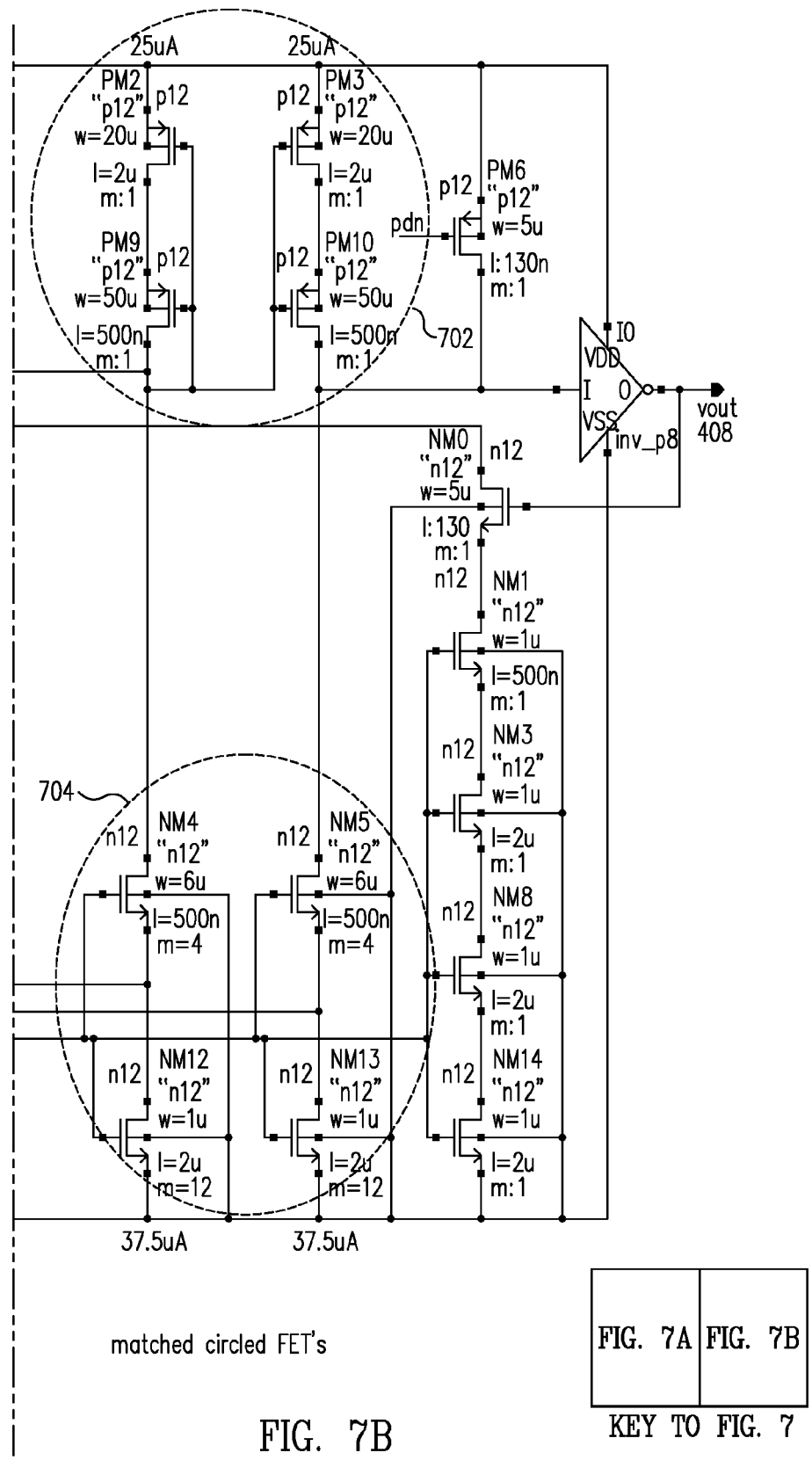

FIG. 7 illustrates a schematic diagram of the comparator circuit 402 in accordance with an embodiment of the present invention. The comparator circuit 402 includes inputs avdd 516, vinp 512, i25ua 520, pd and ayss 518. The comparator circuit 402 also includes output 408. When the voltage at vinp 512 increases to a pre-determined level (e.g., 350 mV), the comparator 402 generates a high level output 408 to indicate the charging time needed to reach the pre-determined voltage level. It is contemplated that the field effect transistors (FETs) shown at 700, 702 and 704 be substantially matched in operation characteristics to generate a valid comparison. Operation of other components shown in FIG. 7 and not discussed herein should be readily apparent to those having ordinary skill in the art.

Figure 8:
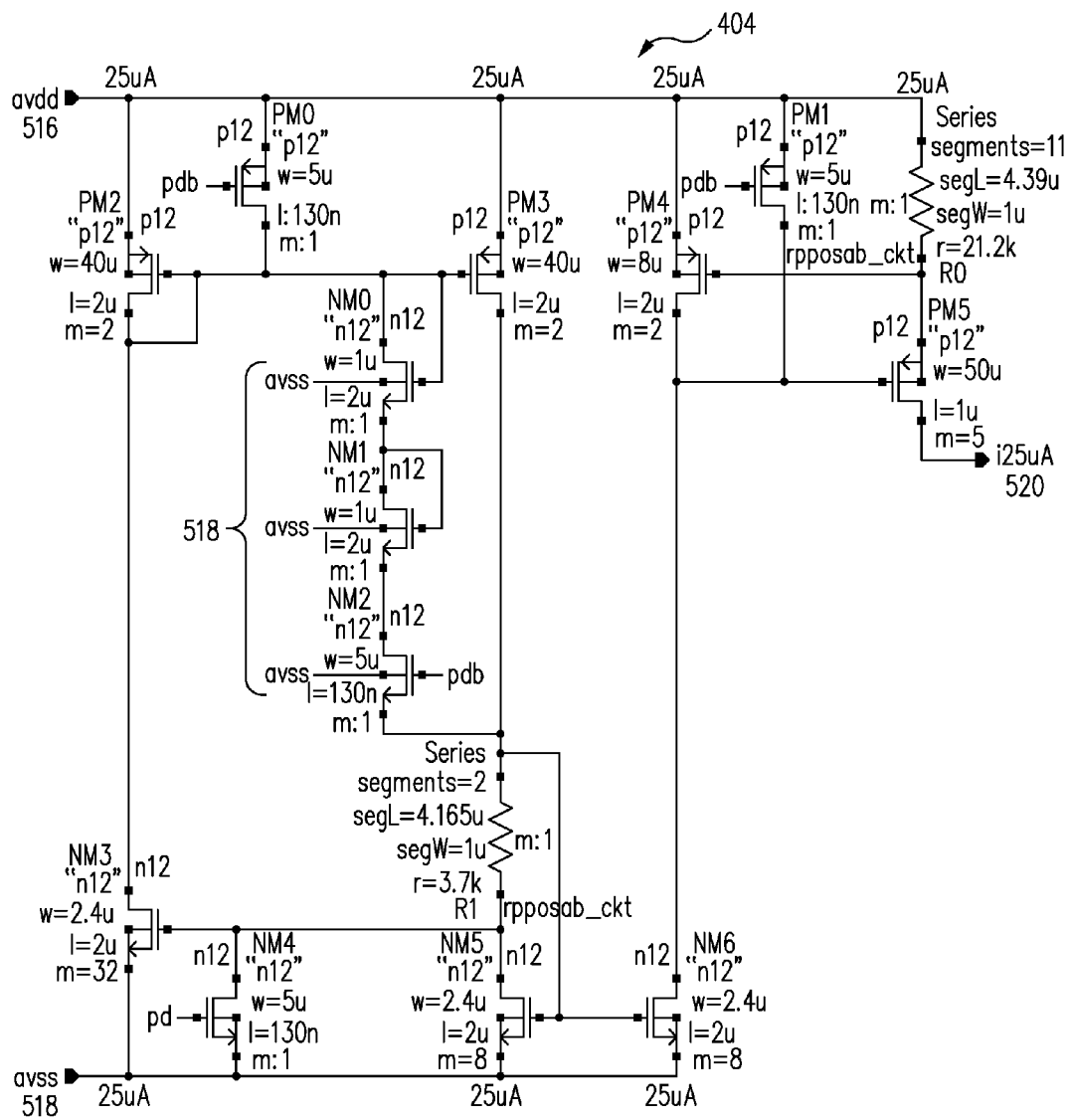
FIG. 8 illustrates a schematic diagram of a detection biasing circuit in accordance with an embodiment of the present invention.
Figure 8:
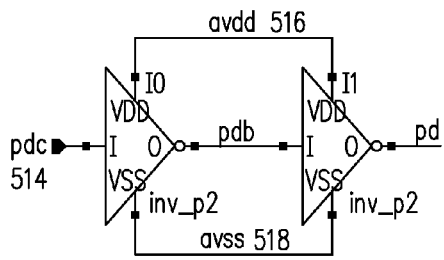

FIG. 8 illustrates a schematic diagram of the detection biasing circuit 404 in accordance with an embodiment of the present invention. The biasing circuit 404 includes avdd 516 and ayss 518. The biasing circuit 404 provides an output current i25ua of approximately 25 micro Amps, at node 520 to allow the comparator 402 to generate an accurate comparison with respect to the input of the comparator 402 at vinp 512. Operation of other components shown in FIG. 8 and not discussed herein should be readily apparent to those having ordinary skill in the art.

Figure 9:
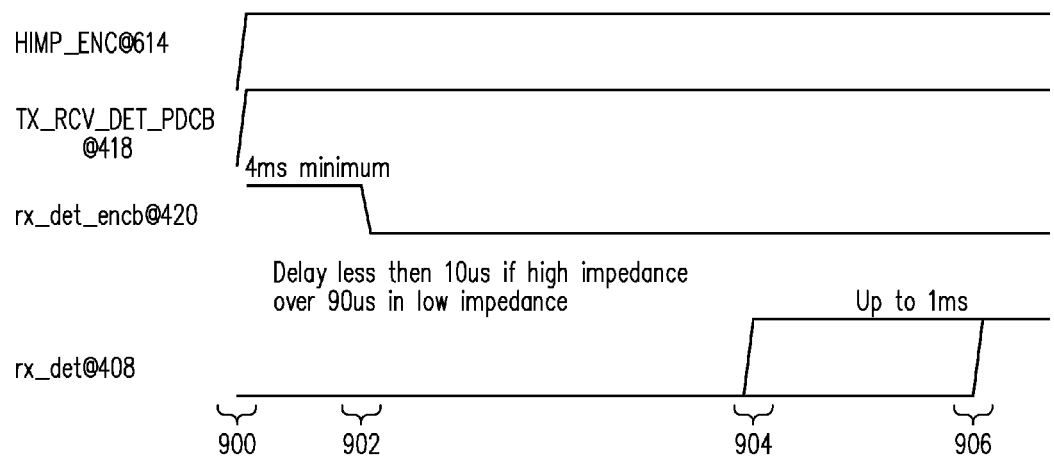
FIG. 9 illustrates timing diagram graphs of waveforms at selected points on a detection system in accordance with an embodiment of the present invention.

As should be understood, the operation of the systems and circuits provided herein provide selected waveforms as shown in FIG. 9. FIG. 9 illustrates timing diagram graphs of waveforms at the selected points on a detection system in accordance with an embodiment of the present invention. For example, when detection of a coupled device, such as the receiver device 416, is desired, the HIMP_ENC detect/communication switch signal 614 at the gate of switch 604 goes from a logic 0 to a logic 1 at time a time 900 designated to begin detecting. Similarly, when detection of a coupled device, such as the receiver device 416, is desired, the TX_RCV_DET_PDCB signal 418 at the reference generator goes from a logic 0 to a logic 1 at time 900 designated to begin detecting. Then, approximately 4 milliseconds after time 900 that is designated to begin the detection mode, the rx_det_encb signal at 420 transitions at time 902 from a logic 1 to a logic 0 to open switch 412, thereby providing the detection current 508 to the buffer circuit 415 and then on to the receiver device 416. During the detect mode, the comparator output rx_det signal at 408 transitions from a logic 0 to a logic 1 signal when the voltage at vinp 512 reaches the pre-determined threshold value. The time for this transition may be either time frame 904 or time frame 906. The transition time maybe less than approximately 10 micro seconds at 904 when the output impedance on cables at nodes 413 and 414 is found to be high and the RC circuit of FIG. 2 charges quickly, meaning that no receiver device 416 is detected or the receiver device 416 is connected but is not ready to communicate. Conversely, the transition time may be greater than approximately 90 micro seconds at 906 when the output impedance on cables at nodes 413 and 414 is found to be low and the RC circuit of FIG. 3 charges more slowly, meaning that the receiver device 416 is detected and the receiver device 416 is ready to communicate. This can also be seen in FIGS. 10 and 11. It is to be understood that other values and other times may be used with embodiments of the present disclosure.

Embodiments described above illustrate but do not limit the invention. It should also be understood that numerous modifications and variations are possible in accordance with the principles of the present invention. Accordingly, the scope of the invention is defined only by the following claims.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of detecting a presence of an externally coupled receiver device, the method comprising:
   generating a reference current;
   passing the reference current via a conductor to a shared buffer circuit, wherein the shared buffer circuit is operable to selectively pass the reference current or a communication signal to the externally coupled receiver device;
   switching between a detect mode where the reference current is provided to the externally coupled receiver device and between a communicate mode where the reference current is blocked and the communication signal is provided to the externally coupled receiver device;
   monitoring a voltage value of the conductor and a time for the voltage value to reach a pre-determined threshold value in response to the reference current; and
   detecting a presence of the externally coupled receiver device based on the monitored time, wherein the voltage value rises slower when the externally coupled receiver device is connected and enabled to receive the communication signal than when the externally coupled receiver device is not connected or is not enabled to receive the communication signal.

2. The method of claim 1, wherein the reference current is fed to a resistor and capacitor connected in series with a ground potential in the externally coupled receiver when the externally coupled receiver is enabled.

3. The method of claim 1, wherein the step of detecting a presence of the externally coupled receiver device is based on the determination whether the voltage value reaches the threshold value in a time greater than approximately 200 micro seconds.

4. The method of claim 1, further comprising coupling the receiver device externally via a serial bus to a host device.

5. The method of claim 4, wherein the serial bus comprises two complementary data lines which are AC coupled in the externally coupled receiver device.

6. The method of claim 1, further comprising splitting the reference current into a pair of reference currents and passing the pair of reference currents to the externally coupled receiver device.

7. The method of claim 1, wherein the communication signal is a differential communication signal.

8. The method of claim 1, further comprising interrupting power to the shared buffer circuit during the detect mode.

9. A detection circuit device operable to detect a presence of an externally coupled receiver device, the detection circuit device comprising:
   a transmitter circuit operable to generate a reference current;
   a shared buffer circuit operable to receive the reference current via a conductor, the shared buffer circuit also configured to selectively pass the reference current or a communication signal to the externally coupled receiver device, wherein the shared buffer circuit is further configured to switch between a detect mode where the reference current is provided to the externally coupled receiver device and between a communicate mode where the reference current is blocked and the communication signal is provided to the externally coupled receiver device; and
   a detection circuit configured to monitor a voltage value of the conductor and a time for the voltage value to reach a pre-determined threshold value in response to the reference current and detect a presence of the externally coupled receiver device based on the monitored time, wherein the voltage value rises slower when the externally coupled receiver device is connected and enabled to receive the communication signal than when the externally coupled receiver device is not connected or is not enabled to receive the communication signal.

10. The device of claim 9, wherein the reference current is led to a resistor and capacitor connected in series with a ground potential in the externally coupled receiver when the externally coupled receiver is enabled.

11. The device of claim 9, wherein when the voltage value reaches the threshold value in a time greater than approximately 200 micro seconds.

12. The device of claim 9, wherein the externally coupled receiver device is a peripheral device coupled through a serial bus with the detection circuit device.

13. The device of claim 12, wherein the serial bus comprises two complementary data lines which are AC coupled in the externally coupled receiver device.

14. The device of claim 9, wherein the shared buffer circuit is operable to split the reference current into a pair of reference currents and pass the pair of reference currents to the externally coupled receiver device.

15. The device of claim 9, wherein the communication signal is a differential communication signal.

16. The device of claim 9 operable to interrupt power to the shared buffer circuit during the detect mode.

17. A universal serial bus USB hub device comprising:
   a USB communication signal input; and
   a detection circuit device operable to detect a presence of an externally coupled receiver device, the detection circuit device comprising:
      a transmitter circuit operable to generate a reference current;
      a shared buffer circuit configured to receive the reference current via a conductor, the shared buffer circuit also configured to selectively pass the reference current or a communication signal to the externally coupled receiver device, wherein the shared buffer circuit is further configured to switch between a detect mode where the reference current is provided to the externally coupled receiver device and between a communicate mode where the reference current is blocked and the communication signal is provided to the externally coupled receiver device; and
      a detection circuit configured to monitor a voltage value of the conductor and a time for the voltage value to reach a pre-determined threshold value in response to the reference current and detect a presence of the externally coupled receiver device based on the monitored time, wherein the voltage value rises slower when the externally coupled receiver device is connected and enabled to receive the communication signal than when the externally coupled receiver device is not connected or is not enabled to receive the communication signal.

18. The device of claim 17, wherein the reference current is led to a resistor and capacitor connected in series with a ground potential in the externally coupled receiver when the externally coupled receiver is enabled.

19. The device of claim 17, wherein when the voltage value reaches the threshold value in a time greater than approximately 200 micro seconds.

20. The device of claim 17, wherein the externally coupled receiver device is a peripheral device coupled through a serial bus with the hub device.

21. The device of claim 20, wherein the serial bus comprises two complementary data lines which are AC coupled in the externally coupled receiver device.

22. The device of claim 17, wherein the shared buffer circuit is operable to split the reference current into a pair of reference currents and pass the pair of reference currents to the externally coupled receiver device.

23. The device of claim 17 operable to interrupt power to the shared buffer circuit during the detect mode.

* * * * *

UNITED STATES PATENT AND TRADEMARK OFFICE
CERTIFICATE OF CORRECTION

PATENT NO. : 8,489,781 B1
APPLICATION NO. : 12/721268
DATED : July 16, 2013
INVENTOR(S) : Hongming An et al.

It is certified that error appears in the above-identified patent and that said Letters Patent is hereby corrected as shown below:

In the Claims:

Column 10, line 27,
Claim 10, "The device of claim 9, wherein the reference current is led to a resistor and capacitor connected in a series with a ground potential in the externally coupled receiver is enabled." Change to --- "THE DEVICE OF CLAIM 9, WHEREIN THE REFERENCE CURRENT IS FED TO A RESISTOR AND CAPACITOR CONNECTED IN A SERIES WITH A GROUND POTENTIAL IN THE EXTERNALLY COUPLED RECEIVER IS ENABLED."

Column 11, line 10,
Claim 18, "The device of claim 17, wherein the reference current is led to a resistor and capacitor connected in a series with a ground potential in the externally coupled receiver when the externally coupled receiver is enabled." Change to --- "THE DEVICE OF CLAIM 17, WHEREIN THE REFERENCE CURRENT IS FED TO A RESISTOR AND CAPACITOR CONNECTED IN A SERIES WITH A GROUND POTENTIAL IN THE EXTERNALLY COUPLED RECEIVER WHEN THE EXTERNALLY COUPLED RECEIVER IS ENABLED."

Signed and Sealed this
Twelfth Day of November, 2013

Teresa Stanek Rea
*Deputy Director of the United States Patent and Trademark Office*